May 28, 1935.   R. E. NEWELL   2,003,119
EXPANSIBLE BELLOWS
Filed April 10, 1934   2 Sheets-Sheet 1

INVENTOR
Robert E. Newell

May 28, 1935.  R. E. NEWELL  2,003,119
EXPANSIBLE BELLOWS
Filed April 10, 1934  2 Sheets-Sheet 2

INVENTOR
Robert E. Newell
By Byrnes, Stebbins & Blake
Attorneys

Patented May 28, 1935

2,003,119

UNITED STATES PATENT OFFICE 2,003,119

EXPANSIBLE BELLOWS

Robert E. Newell, Irwin, Pa., assignor to Robertshaw Thermostat Company, Youngwood, Pa., a corporation of Pennsylvania Application April 10, 1934, Serial No. 719,868

5 Claims. (Cl. 236—99)

My invention relates broadly to thermal control and more particularly to certain new and useful improvements in expansible bellows for use in thermostatic structures for the purpose of controlling and regulating temperatures by effecting control of a controlling element such as a valve, a switch or the like.

By my invention I provide an improved bellows of the fluid type which has a number of advantages over structures known heretofore. It is particularly advantageous in thermostatic structures used for regulating temperatures. In such structures considerable difficulty has been encountered heretofore by reason of the effect of local heat on the bellows of the bellows type thermostat. In the structures known heretofore it has been necessary to embody a compensating element in the structure to compensate the effect of local heat, particularly where the structure was located in such position as to be subjected to appreciable temperature changes. Such structures are used in ordinary gas ranges and in various other equipment which are of such design as to make it desirable to locate the thermostatic structure in such position that the bellows will be subjected to widely varying temperatures. As stated above, it has been necessary in such installations to provide a compensating element such as a bi-metal compensating disk in order to compensate for the effect of this local heat.

My improved bellows is of such design that local heat in installations such as those above referred to will have little or no effect thereon and where my improved bellows is used it will be unnecessary to provide compensating means to compensate the effect of the local temperatures.

I have found that the fluid in bellows in installations of the character above referred to is the offending element which makes it necessary to provide compensating means. I have found that local heat will cause the fluid to expand and expand the bellows and cause it to operate the control element at temperatures other than those for which the structure is set. Accordingly, it is one of the objects of my invention to provide a bellows which, when in a non-expanded state, will be substantially devoid of the operating fluid and which, even when in an expanded state, will contain but a small amount of operating fluid.

In the accompanying drawings I have shown for purposes of illustration only a preferred embodiment of my invention and one application thereof in a thermostatic structure. It will be understood that my invention may be otherwise embodied and that its use is not limited to thermostatic structures of the character shown in the drawings. As a matter of fact, the structure which I provide by my invention has a wide variety of uses and may be used in various types of control apparatus.

In the drawings,—

Figure 1:
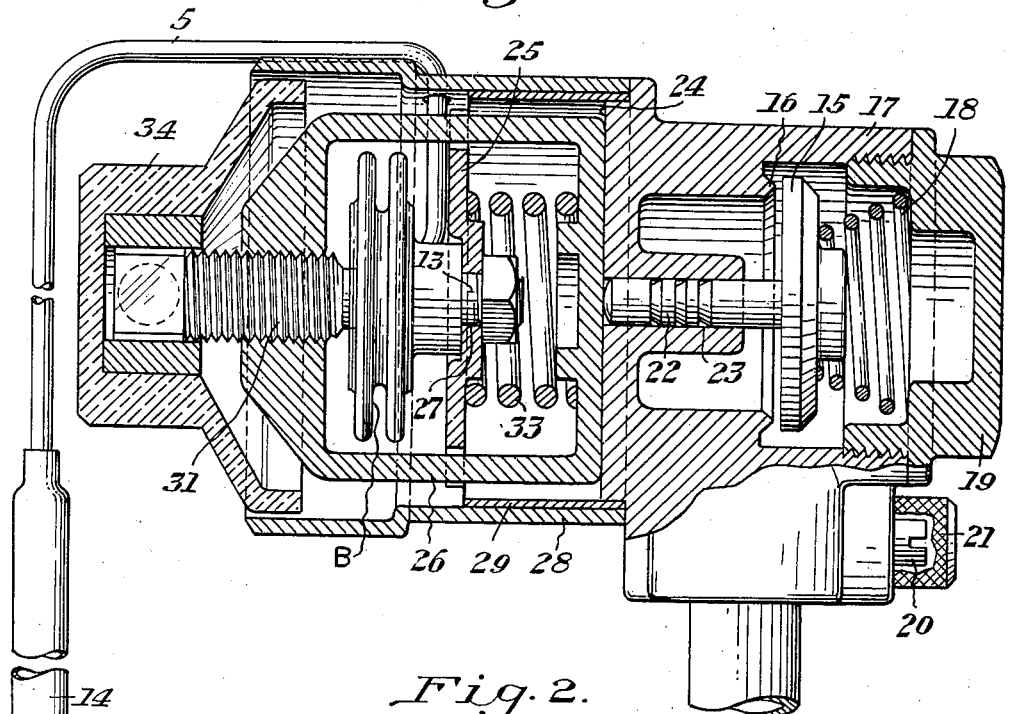
Figure 1 is a vertical sectional view, partly in elevation, through a thermostatic structure embodying my invention.
Figure 2:
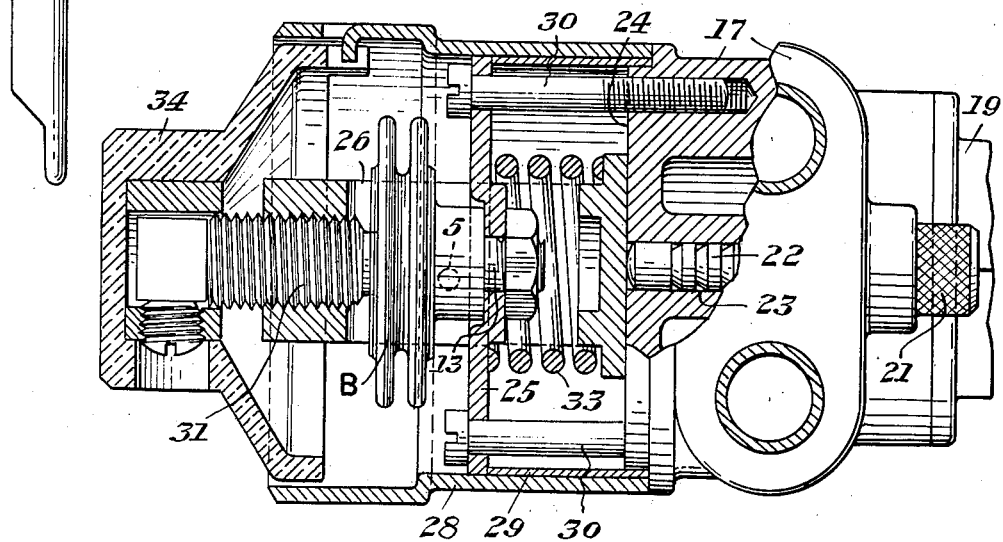
Figure 2 is a view similar to Figure 1 taken at right angles to the showing of Figure 1.
Figure 3:
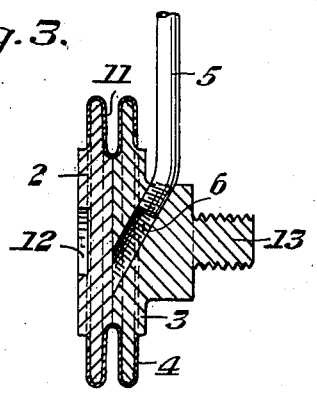
Figure 3 is a section through the bellows which I provide and showing it in normal or non-expanded condition.

Referring to Figures 3 to 6, inclusive, I will first describe the bellows which I provide by my invention. The bellows consists of a head 2, a base member 3 and a corrugated cylinder 4 for joining the base and the head and for providing a closed chamber between the head and the base member when the bellows has been expanded by the introduction of a fluid through the tube 5 and the passageway 6 formed in the base member.

The head of the bellows is circular and is provided with a flange 7 extending therearound and a flat inner face 8. The base member 3 is circular and provided with a flange 9 extending therearound which is substantially the same as the flange 7 on the head. The base member likewise is provided with a substantially flat inner face 10, the diameter of which is substantially the same as the diameter of the inner face 8 of the head 2. The flanges 7 and 9 are offset from the inner faces 8 and 10 of the head and base member, respectively, so as to provide a space between the flanges 7 and 9 to receive a corrugation 11 of the corrugated cylinder 4. The flanges 7 and 9 and their junctions with the inner faces 8 and 10 are so contoured as to provide a snug fit between the corrugated cylinder and the head and base member. The ends of the corrugated cylinder 4 extend completely over the flanges 7 and 9 and downwardly on the outer faces thereof, and are welded or soldered or otherwise secured to the outer faces of these flanges. The corrugated cylinder 4 when in normal position snugly fits around the flanges 7 and 9 and holds the inner face 8 of the head 2 and the inner face 10 of the base member 3 snugly against each other whereby any fluid will be eliminated from or prevented from entering the chamber between the faces and the corrugated cylinder.

Figure 4:
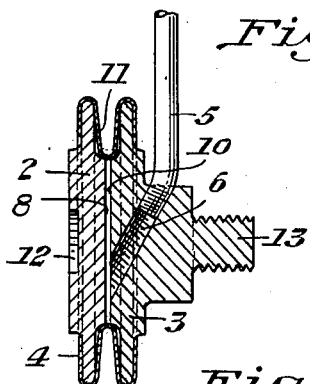
Figure 4 is a view similar to Figure 3 but showing the structure in an expanded condition.
Figures 5, 6:
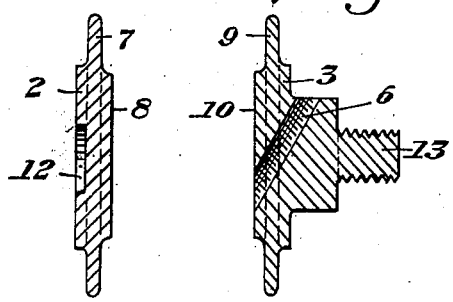
Figure 5 is a sectional view through the head of the structure shown in Figure 3.
Figure 6 is a section through the base member of the structure shown in Figure 3.
Figure 8:
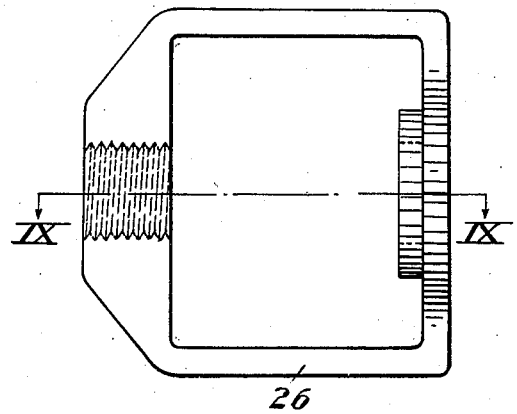
Figure 8 is a side view of the yoke of the structure shown in Figures 1 and 2.
Figure 7:
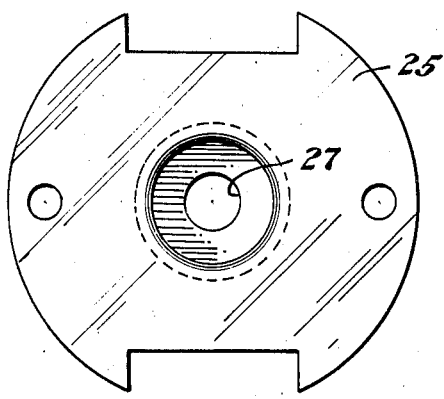
Figure 7 is an elevational view of the base plate of the construction shown in Figures 1 and 2.
Figure 9:
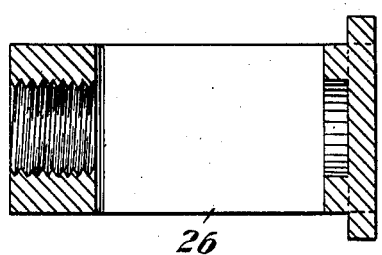
Figure 9 is a sectional view taken along the line IX—IX of Figure 8.

A tube 5 is threaded in a passageway 6 in the base member for supplying the fluid for operating the bellows to the face 10 of the base member. As fluid is fed through the passageway 6 a pressure will be exerted on the face 8 of the head 2 and the head and base member forced apart. The fluid will then enter the chamber formed by the head, the base member and the corrugated cylinder. In Figure 4 the bellows is shown as having been expanded by a fluid and the chamber between the head and base member and the corrugated cylinder may be readily seen. The fluid can readily move the head and base member relative to each other by reason of the fact that the corrugated cylinder is secured to the head and base member only on the outer faces of the flanges 7 and 9.

A recess 12 may be provided in the outer face of the head for cooperation with a screw or other device for transmitting movement of the head to the control element.

The base member 3 is provided with a threaded stud 13 for rigidly securing the bellows to an appropriate support.

In actual practice, the movement of the head and base member relative to each other is maintained as small as possible so that in expanding it will not be necessary to inject any more fluid between the head and base member than is required to effect the desired movement for operating the control means. A certain amount of fluid is injected between the head and base member, however, as a result of the expansion of the fluid in the bulb to which the tube 5 is connected, the bulb, of course, being located in the oven or other chamber or element, the temperature of which is to be controlled. When in normal or non-expanded position, the bellows contains no fluid whatever. In fact, in actual practice I have found it desirable that there be no fluid in the bellows until an appreciable temperature has been obtained. For instance, in oven installations I have found it desirable that there be no fluid in the bellows until the temperature of the oven reaches 200 to 250° F. I have found it desirable to charge the bulb and tube so that at ordinary room temperatures there is a vacuum between the head and base member of the bellows. This vacuum may extend some distance down the capillary tube. Upon heating of the bulb the fluid will expand and fill this vacuum. When the bulb in an oven installation, for instance, has reached a temperature of 200° F. the fluid will have reached the bellows base member and head and they will begin to operate. In the ordinary oven the cooking range is between 250° and 500° F. The bulb to be used in such installations will preferably be made so that the total expansion within this range will be approximately 1/32nd inch, that is, the actual relative movement of the head and base member after a temperature of 200° is reached will not be more than 1/32nd inch.

In the drawings I have shown my improved bellows as applied to a thermostatic structure for controlling a valve for supplying fuel to an oven burner. In a construction of this character a bulb 14 which contains the expansible fluid is inserted in the chamber or medium the temperature of which is to be controlled, and the expansible fluid contained therein expands and contracts in accordance with variations in temperature of such medium or chamber. The bulb 14 is connected by means of the capillary tube 5 to the bellows B. The capillary tube as well as the bellows contains the fluid and expansion or contraction of the fluid in the bulb results in an expansion or contraction of the bellows. As stated above, it is preferable in structures of this character to provide a vacuum in the bellows at room temperature, which vacuum will extend a short distance up the capillary tube. This will prevent any fluid from entering the bellows before the temperature of the oven or other medium reaches a minimum operating temperature.

The flow of fluid to the oven burner or the like is controlled by means of a valve member 15 adapted to seat on a valve seat 16 carried by the valve casing 17. The valve member 15 is normally forced toward its seat by means of a spring 18, one end of which bears against the valve member 19 and the other end of which bears against the one face of the valve member 15. The valve cap 19 is conveniently threaded in the casing so as to permit ready access to the internal portions of the valve.

The valve is provided with a by-pass for supplying a regulated quantity of gas past the main valve at all times for supplying a pilot burner. The size of the by-pass opening is controlled by a by-pass key 20 internally enclosed by a cap 21 threaded in the valve casing.

The valve member 15 is operated by means of a valve stem or pin 22 which extends through an opening 23 in the valve casing, the pin projecting a slight distance beyond the face 24 of the valve casing.

The expansible bellows B is mounted on a base plate 25. This base plate is substantially circular in general configuration but having two opposite sides thereof cut away to provide space for the yoke 26 to extend thereby. The base member 3 of the bellows is provided with a threaded extension 13 adapted to project through an opening 27 centrally located in the base plate 25 to receive a nut for holding the bellows rigidly on the base plate.

A housing 28 which is substantially cylindrical in shape is provided for encasing the bellows and bellows assembly for protecting it against dirt and blows. The housing 28 and the sleeve 29 fit over a circular portion on the front face of the valve casing and are held in place by screws 30 which are threaded in the valve casing. These screws 30 also serve to rigidly secure the base plate to the valve casing.

In thermostatic structures of this character it is necessary, of course, that the control valve close with rising temperatures. In order to obtain this movement I prefer to mount the stationary end of the bellows closest the valve member to be operated and to transmit the movement of the movable end of the bellows around the bellows. In the structure illustrated in the drawings, the end of the bellows mounted on the base plate 25 is stationary and the opposite end of the bellows movable. The movement of the forward end of the bellows is transmitted to the pin or valve stem 22 by a screw 31 and a yoke 26, the one end of the screw 31 engaging the recess 12 in the head of the bellows. The yoke 26 is threaded on the screw 31 and longitudinal movement of the screw 31 will move the yoke and operate the valve stem 22 in one direction or the other. A spring 33 extending beyond the base of the yoke and the base plate is provided for holding the yoke and the screw 31 and the adjusting dial 34 in proper position. The adjusting dial 34 is mounted on the forward end of the screw and rotation thereof adjusts the yoke in one direction or the other for effecting adjustment of the structure for operation at different temperatures.

For a more detailed description of a structure of this character reference is hereby made to my copending application Serial No. 710,847.

The advantages of a bellows such as I provide by my invention in structures of the above character over the types of bellows known heretofore will be apparent to those skilled in the art. One of the most important advantages is that it is not affected by local heat to which the device is subjected and, consequently, no compensating means for compensating local heat need be used.

While I have shown and described a preferred embodiment of my invention and one application thereof, it will be understood that I do not intend to be limited thereby but that my invention may be otherwise embodied within the scope of the following claims.

I claim:

1. As an article of manufacture, an expansible bellows comprising a base member having a flat inner face, a head having a flat inner face, a corrugated cylinder joining the head and base member and arranged to normally hold the inner faces of said head and base member against each other, the flat inner faces of said head and base members being surrounded by portions contoured to substantially conform to the inner surface of said corrugated cylinder, and means for supplying a fluid to said bellows between the head and base member for moving them relative to each other.

2. As an article of manufacture, an expansible bellows comprising a base member having a flat inner face, a head having a flat inner face, a corrugated cylinder joining the head and base member and arranged to normally hold the inner faces of said head and base member against each other, the flat inner faces of said head and base member being surrounded by portions contoured to substantially conform to the inner surface of said corrugated cylinder and a passageway in one of said members for supplying a fluid between the head and base member for effecting a relative movement therebetween.

3. As an article of manufacture, an expansible bellows comprising a base member having a flat inner face, a head having a flat inner face, a corrugated cylinder joining the head and base member and arranged to normally hold the inner faces of said head and base member against each other, the edges of said base member and head being contoured to substantially conform with the inner surface of said corrugated cylinder whereby fluid will be excluded from said bellows between said head and base member under normal conditions, and means for supplying a fluid to said bellows between the head and base member for moving them relative to each other.

4. As an article of manufacture, an expansible bellows comprising a base member having a flat inner face, a head having a flat inner face, a corrugated cylinder joining the head and base member and arranged to normally hold the inner faces of said head and base member against each other, the edges of said base member and head being contoured to substantially conform with the inner surface of said corrugated cylinder whereby fluid will be excluded from said bellows between said head and base member under normal conditions, and a passageway in one of said members for supplying a fluid between the head and base member for effecting relative movement therebetween.

5. In a thermostatic structure, the combination with control means of a bellows assembly including an expansible bellows comprising a base member having an inner face, a head having an inner face, a corrugated cylinder joining the head and base member and arranged to normally hold the inner faces of said head and base member against each other, the edges of said base member and head being contoured to substantially conform with the inner surface of said corrugated cylinder, whereby fluid will be excluded from said bellows between said head and base member under normal conditions and means for supplying a fluid to said bellows between the head and base member for moving them relative to each other, and means for transmitting movement from said bellows to said control means.

ROBERT E. NEWELL.